June 26, 1934.  H. T. WHEELER  1,964,237
UNEQUAL DENSITY PACKING
Filed Oct. 29, 1931

INVENTOR.
Harley T. Wheeler

UNITED STATES PATENT OFFICE 1,964,237

UNEQUAL DENSITY PACKING

Harley T. Wheeler, Dallas, Tex.

Application October 29, 1931, Serial No. 571,822

4 Claims. (Cl. 286—26)

This invention relates to a method of arranging the packing rings in a stuffing-box and its chief advantage is the automatic control of the drop of pressure within the set of packing.

Another advantage is that the friction due to movement or of rest is evenly distributed over the area of contact.

Yet another advantage is that by evenly distributing the friction, the lowest possible coefficients of friction between the contacting surfaces is secured.

One other advantage is that the wearing capability of the packing is considerably prolonged by the creation of uniform friction.

Another advantage of consequence is that the saturation by pressure of the packing fibers is reduced to a possible minimum.

Still another and important advantage is that the necessity of delicate and exact manual adjustments of the packing are practically eliminated by this method of arrangement.

Other advantages and objects of construction will be disclosed as the description proceeds, accompanied by the drawing, wherein.

Figure 1:
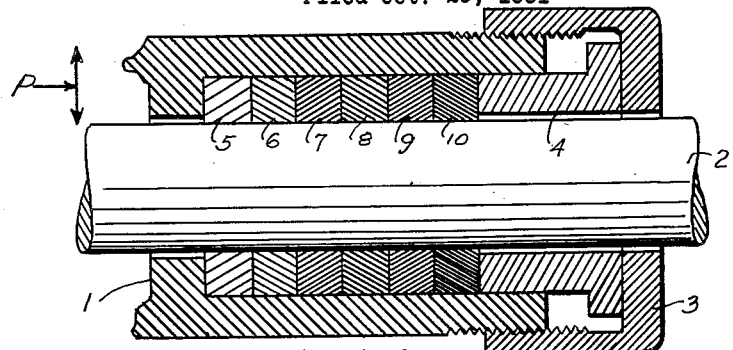
Figure 1 is a cross-section of a stuffing-box containing braided packing rings of a square cross-section.

This invention relates particularly to the common practice of all packing manufacturers as to the making of a uniform product, which is to say, if it is braided, perhaps thousands of feet of the desired size and construction are made, every increment of length being alike as to lubrication, braiding, the material and so on. If a moulded type of ring is made, all rings of the same size are constructed as nearly identical as possible; such a product may be termed packing rings of averaged porosity and density. The practice of making packing according to a unit standard is at present considered correct and an indication of good factory management, the cost being low on account of duplication during production.

In like manner, the consumers of packing have been taught by the manufacturers to make use of this kind of a standardized product, as it is convenient for ordering, for stocking in warehouses and for ease in installation, and the current belief is that such uniformity is desirable.

Briefly, the purpose of this invention is to show that such uniform methods of manufacture and consumption are incorrect and actually are at the base of the unreliable and conflicting results constantly obtained. The usual explanation given for failures of averaged porosity rings is that "the condition is unfavorable to the packing." Whereas, as I shall prove, pressure as a function in the creation of friction is not understood either by the manufacturers or the consumers of packing and is under control only by accident, which is invariably known as a "favorable condition." To explain the enigma of a set of packing as it is exposed to various conditions, I will refer hereinafter to my application for Letters Patent, Serial Number 533,430, filed April 28th, 1931, in which are enumerated twenty-four laws of friction, as related to porous bodies made elastic by pressure.

My general theory of a packing structure is that the pressure impressed against the packing is counteracted by the friction created due to a steady, tho minute flow of the liquid gas or vapour under pressure thru innumerable joints and openings of the packing rings. A packing therefore cannot be tight: it is a retarding agent only, the reduction of pressure being accomplished by a minute loss of that liquid gas or vapour, and representing an expenditure of energy. The volume lost and the energy consumed, in comparison to the friction of contact is a measure of the packing efficiency. A packing structure is a porous body, and if correctly made becomes elastic by means of reaction to impressed pressure.

Furthermore the duties expected of a packing are: (1) to reduce the impressed pressure to a lower level, (2) to absorb the thrust of the impressed pressure against the exposed area of the packing and to transmit this thrust to the frame of the machine, and (3) to seal the joint with a minimum of friction and leakage. These three actions are to be accomplished without injuring the packing structure over long periods of time.

To further the discussion of pressure reactions within a set of packing, reference is now made to Figure 1, a typical stuffing-box body 1, a shaft 2 extending thru the aforesaid body, an adjustable packing nut 3 threaded to the body 1 compressing the gland 4 against the packing rings 5, 6, 7, 8, 9 and 10.

Braided packing is made of a uniform texture, as for example, a structure of fabric impregnated with an oil, a structure of fabric vulcanized together with a rubber cement, shredded metals with fibrous binders, and the like. If the rings 5 to 10 inclusive represent any one kind of a braided packing, all will be alike as to porosity and density.

Figure 2:
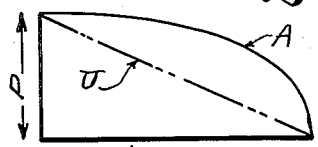
Figure 2 is an internal-pressure diagram of averaged porosity packing rings applied in the stuffing-box of Figure 1.

Referring now to Figure 2, an internal-pressure chart, the length L being to scale and representing the contact surface of the braided rings 5 to 10 inclusive, of Figure 1. The pressure P is to scale and represents the pressure impressed on the packing ring 5 in the body 1 of Figure 1. Experiment first determined that the reduction of pressure P thruout the packing assembly of an averaged porosity set of rings does not follow a uniform reduction line such as U, but along the line A, the greatest rate of reduction being farthest from the source of pressure. It was proven under the laws of friction that the friction occurs in greatest amounts in the area of greatest drop of pressure, which means that the inside rings 5 and 6 of an averaged density and porosity set will create very little friction and that most of the sealing action is accomplished by the outermost rings 8, 9 and 10. Thus the most wear comes on but a fraction of the contact surface which is available.

The detailed explanation of this actual reduction of pressure is found by examining the paths along which the pressure may travel. Pressure fluid may escape as follows: (1) along the rod, (2) along the wall of the box, and (3) pass thru the packing ring. If it escapes along either the rod or the wall surface, obviously the succeeding rings must be tight enough to stop it, thereby causing a high stress in the outermost rings which would not be necessary if each packing ring would cause a proportional pressure reduction.

As manufactured, each of the rings 5 to 10 inclusive, of Figure 1, are now considered to be of an averaged porosity, being cut from the same stock piece. Without any impressed pressure in the box, the gland 3 will compress each ring an equal amount and reduce the porosity of each ring a like amount. But when pressure is impressed on the surface of the inner ring 5, another kind of an action takes place which immediately changes the original relation of averaged porosity, due to the accumulation of thrust.

The first law of friction states that: The thrust on any increment of area of a porous elastic structure is equal to the drop of pressure across the area considered. That is, the reduction of pressure is coincident with the creation and rise of a thrust, the sum of the thrust and the actual pressure existing at any point, always being equal to the impressed pressure P. In Figure 1, the resolution of pressure P into any two directions, in equal amounts, one being perpendicular to the rod surface and the other perpendicular to the wall surface, is true for all braided packings, P being equal in any and all directions. Also P minus the drop of pressure is equal in all directions, the thrust being related likewise.

It therefore follows that the accumulation of a thrust in the packing rings changes the porosity, reducing the latter in degree and compresses the outermost rings, principally 8, 9 and 10. The outer face of the ring 10 has against it a thrust equal to the full value of the pressure P, less a minute pressure necessary to maintain a seepage flow thru the structure. The thrust in any ring is equal to the difference of the pressure drops between the points considered. Herein lies the difficulty of adjusting any set of braided packing: The thrust at the outermost ring 10 is fixed and determined by the full value of the pressure P, and no slackening of the gland adjustment can change it. The thrusts at intermediate points are determined by the characteristic reaction of the packing structure to pressure, and cannot be changed by slack gland adjustment, altho they may be increased by excessive compression. The difficulty of adjusting any such a packing is the basis of incorrect beliefs that personal skill can overcome the "packing condition."

It should now be obvious that the inner ring 5, and perhaps 6, are merely floating in the box, as actual pressure measurements have demonstrated that there is practically no drop of pressure along their length for any kind of braided packing. And furthermore, if the gland nut 3 is tightened sufficiently to cause a drop of pressure across rings 5 and 6, friction of contact will quickly be created at this new point of pressure drop and lubrication, which should be permitted to reach the rings 8, 9 and 10, is shut off. The rings 9 and 10 still being under the accumulated thrust due to the total drop of pressure are still creating friction. Excessive frictional contact occurs.

From a practical point, all braided packings operate most efficiently when the inner ring 5 merely touches the bottom of the box, and the operator's skill can only consist in sensing that the stated position is determined. The characteristic of any such a packing is determined solely by the change of porosity due to accumulated thrust in the outer rings 8, 9 and 10. Gland adjustment merely upsets the normal reaction determined by the manufacturer who made the packing. The foregoing relations are the basis of the arguments as to "finger tight" adjustments and what they should consist of, the facts having been found to be that when the threads of the gland nut 3 are in free running condition, any tension greater than "finger tight" is forcing the ring 5 against the bottom of the box and depriving the rings 8, 9 and 10 of needed lubrication and cooling effects.

Figure 3:
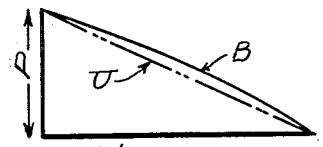
Figure 3 is an internal-pressure diagram of graduated porosity packing-rings applied in the stuffing-box of Figure 1.

It is, however, possible to change the relations as before set forth by rearranging the porosity of the packing rings in such a manner as to cause the drop of pressure to be more nearly uniform thruout the assembly. It should be apparent that the first step is to make the ring 5 of a very porous material to induce the pressure to pass thru the ring and thus remove any tendency to escape along the rod or the box wall. Then the ring 6 should be slightly denser than ring 5, so as to overcome the reaction of the thrust which is accumulating from the drop of pressure which occurred across ring 5. So on thru the assembly the porosity should be decreased, making ring 10 very dense. In this manner the original reaction to high compression which occurs with average density rings is changed; a far greater drop of pressure occurs across rings 5, 6 and 7, and less across the rings 8, 9 and 10. The total thrust at the outer surface of the ring 10 is still the same as the pressure P, but ring 10 has been made denser and more able to carry the friction and compression load, and the rings 5 to 9 are creating a proportion of the friction, hence the actual thrust in any increment of length in the rings 8, 9 and 10 is much less, as will be seen by referring to Figure 3. The latter is an internal-pressure chart, the length L being to a scale representing the length of the contact of the averaged density rings 5 to 10 inclusive, of Figure 1, the pressure P to scale representing the pressure impressed on the packing assembly in Figure 1. The ring 5 now being porous permits an immediate drop of pressure along the line B, at a greater rate than that of the curve A in Figure 2. Regulating porosity, to offset the unequal compression which occurs in averaged density rings, has therefore increased the rate of pressure drop across the rings 5, 6 and 7, and has decreased the rate across the rings 8, 9 and 10.

This simple change in the arrangement of porous packing assemblies is all that is needed to eliminate most of the troubles commonly encountered with packing, and its advantages are enumerated as follows:

*First*.—Graduated porosity rings eliminate delicate adjustments of a packing set because the inner rings may be highly compressed without changing the flow of seepage into the packing assembly. Regardless of excessive gland pressure, the fast rate of pressure drop shown by Figure 3 will persist across the rings 5, 6 and 7.

*Second*.—When subjected to variable pressure, an assembly of averaged density rings will cause a residual friction during the reduction of pressure due to enlargement of the packing by saturation (references: the 6th, 7th, 8th, 9th and 10th laws of friction dealing with measurement of the volume of occupancy and of saturation). With my arrangement of porosities, the seepage may flow instantly back toward the source of pressure, thereby reducing saturation and hysteresis to a possible minimum.

*Third*.—The uniform drop of pressure causes a uniform creation of friction and a uniform wear of the contact surfaces.

*Fourth*.—By distributing the friction of contact over the available area, high coefficients of friction between the packing material and the moving element are avoided. A considerable reduction of total friction is obtained, because the coefficient of friction increases more than proportionally to the normal applied pressure, when the pores of the packing are excessively reduced by accumulated thrust.

Referring again to Figure 3, the uniform line of pressure drop U cannot be realized with any braided packing, even tho the porosity is graduated as before mentioned. This is due to the necessity of some gland adjustment to press the ring 5 against the bottom of the stuffing-box, the mechanical compression causing an excessive structure reaction to pressure. The method however, is an improvement over the present usage of braided packings, but is of short duration in service due to quick exhaustion of the customary lubricants used for securing a sealing effect against pressure.

Most of the patent art on packing improvement deals with the advantage of shape, but without analyzing the actual result in creating friction. To realize the lowest total friction in a set of packing, which unquestionably gives better service and longer wear seems to be the goal of most of the investigations. Yet this is not enough to meet the present conditions of high pressures and temperatures. The friction within the set of packing at any one point must be equal to that at any other point to meet demands and keep the coefficients of friction within the limits which will permit allowable wear of available packing materials. As seen by Figure 2, any averaged porosity set of packing rings has a high maximum friction at the outermost ring 10, which is corrected to a great extent, as in Figure 3, by regulating the porosity.

Previous to my discovery of the laws of friction or porous bodies made elastic by pressure, I believe that there was no method in existence of accurately comparing the advantages of packing construction, from the vantage point of created friction. As the various shapes, porosities, densities and materials are exposed to constant or variable pressure, it should be self-evident that the impressed pressure in all cases is reduced according to my general theory of packing, by counteraction with the friction created by seepage flow. It should also be apparent that no two types of packing will react alike to the same pressure, chiefly due to the effect of porosity on seepage flow. The difference in friction is caused by the variation in seepage flow and is therefore related to saturation, the latter being fully explained and accounted for by the "fluxion chart", such as Figure 7. It is now possible, therefore, to insert packing in my testing machine and investigate the claims of construction by interpreting the effects of saturation.

These research methods have determined which type or shape of packing can be utilized to create a uniform friction of contact and maintain a low strain (friction) per unit area, and point unerringly to the cone-shaped ring to the exclusion of all others, as being capable of making the largest gains by the graduated porosity method of arrangement.

Figure 4:
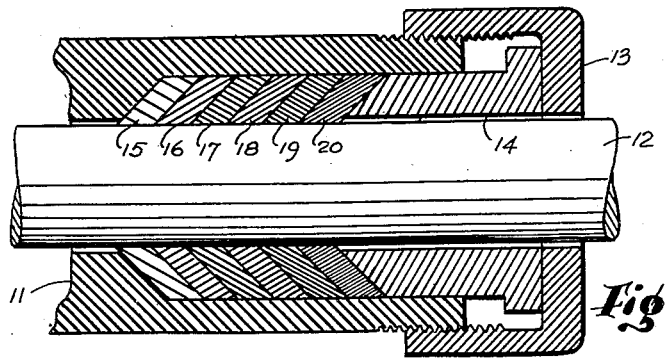
Figure 4 is a special stuffing-box designed to hold cone-shaped packing rings.

Referring now to Figure 4, a typical stuffing-box designed to receive cone-shaped rings. A shaft 12 extends thru the body 11, the latter being formed to receive the packing rings 15, 16, 17, 18, 19 and 20, and at the bottom corresponding in shape to the contour of the ring 15. A packing nut 13 is threaded and adjusts the packing rings through the gland 14.

It is now necessary to consider why the cone-shaped ring is advantageous for the predetermined control and distribution of the friction of contact. When pressure is applied to the convex area of a cone-shaped ring placed on a rod, the inner portions of the cone collapse against the rod and the outer areas bear against the stuffing-box wall due to the endeavor of the cone to change to a radial disc shape having a smaller hole in the center and a greater periphery. Each cross-sectional area increment of a cone is therefore a lever under pressure.

Figure 5:
Figure 5 is a composite diagram showing the internal pressures of averaged density packing rings applied in the stuffing box of Figure 4, and the disposition of normal applied force which causes friction.

The leverage action is further analyzed by Figure 5. The packing rings 15 to 20 (of Figure 4) are shown in outline resting against the cone-shaped gland 14. The upper internal-pressure diagram is to the same scale as the contact length of the rings 15 to 20 inclusive. The pressure P is plotted to a suitable scale. In the lower diagram the pressure P acts against the exposed surface of the ring 15 and is resolved by the parallelogram of forces into a normal applied pressure $P_1$ to create the friction of contact on the rod. A smaller force acting parallel to the surface of the gland 14 bears against the box wall surface and is due to the annular wedge ring reaction, as will be explained.

I have found that an angular packing section presenting a face at an angle with the direction of the fluid pressure in flow will deflect the pressure according to the trigonometric sine of the angle of the contact considered. That is, if the force of the fluid seeping outwardly through the packing and tending to escape along the rod is parallel to the ring face, the sine is zero and none of the pressure thrust can be deflected. If however, the pressure direction is perpendicular to the ring face, the sine of 90 degrees being one, all of the pressure is absorbed as a direct thrust by the ring. At 45 degrees, for example shown in Figure 5, the parallelogram of forces will resolve .707 of the pressure in the direction of the ring face, and also toward the rod normally, substantially as shown in Figure 5. The resolution of impressed pressures and the characteristics of the annular wedge ring reaction are developed in detail in my Serial Numbers 580,015 and 584,093, filed respectively on December 10th and 31st, 1931.

The fluid medium impressed passes thru the packing rings and is reduced away from the source of the pressure to a value $P_1$ by the friction of seepage flow, the drop in pressure causing a thrust which may be resolved into a force normal to the movable surface and another component parallel with the ring surface. In those rings adjacent to the packing gland 14, the factor of support of the rings by the projecting conical surface causes less thrust to be applied against the movable surface and more force to be used in creating the annular wedge ring reaction between the packing gland and the box wall. The factor of support is explained in detail in my application Serial Number 626,040, filed July 29, 1932.

Referring again to the upper diagram of Figure 5, the desired uniform line of pressure drop U is not approximated by averaged density rings, as represented by the drop line C. The drop of internal pressure in conical rings is at a greater rate than is possible in other types, as, for example, the braided type shown by the line A in Figure 2. Thus at a point adjacent to the source of pressure, the cone-shaped ring applies the greatest force normally against the rod and at the packing gland has the least, as compared to any type of packing. At the stuffing-box wall adjacent to the source of pressure it has the least normally applied pressure due to the annular wedge reaction, and at the gland it has the greatest, as compared to any type of packing. The cone therefore seals the rod with greatest force at the innermost point of contact and the box wall at the outermost contact. This is the characteristic pressure and sealing disposition of all averaged density and porosity rings of any conical construction and is a considerable improvement over braided and other forms.

The upper diagram of Figure 5 indicates the flow of internal pressure by pressure drop. The lower diagram of pressures against the rod is the result of thrust normally applied and is due to the drop of pressure, the formation of the annular wedge ring reaction against the stationary surface, and to the factor of support. The drop line C is concave due to the compacting of the materials by the accumulated thrust at various sections. The line of normal thrust in the lower diagram is convex due to the summation of the three main forces acting to create the friction of contact and the sealing effect at the wall surface.

Figure 6:
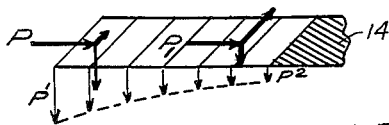
Figure 6 is a composite diagram showing the internal-pressures of graduated porosity packing rings applied in the stuffing-box of Figure 4, and the disposition of normal applied force which causes friction.
Figure 6:

The excessive sealing effect at the moving surface by the innermost points of cone-shaped rings makes possible a suitable reduction of friction by my method of arranging the porosity. It is now considered that the ring 15 of Figure 4 is made highly porous, the ring 16 less so, and so on to the ring 20 which is made dense. Referring now to Figure 6, the lower outline diagram represents the rings 15 to 20 inclusive (of Figure 4) with an impressed pressure P. The upper diagram is an internal-pressure chart, the length to the same scale as the contact length of the rings 15 to 20 inclusive, and the pressure P to a suitable scale.

The excessive porosity of the ring 15 causes a quick drop of pressure, the normal applied pressure $P^3$ against the rod being made equal to the wedge ring reaction against the box wall. After passing thru the rings, the impressed pressure is reduced and an accumulated thrust takes place, creating a normal applied force $P^4$ against the rod, and an equal reaction against the box wall adjacent to the gland 14. Referring again to the upper chart, the pressure reduction line is now U, the ideal. The porosity has been regulated so that all normal applied components between $P^3$ and $P^4$ are equal to each other. Therefore the friction must be equally distributed. The practical effect now is that the sealing force against the moving surfaces and the bearing pressure against the stuffing-box wall are equal respectively at all points. In actual practice this method of arranging cone-shaped rings has proven that such a set can withstand abnormally high pressures instantly applied and to have less than one-half of the friction of any averaged density ring.

Figure 7:
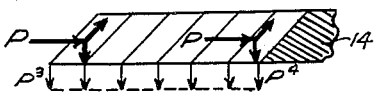
Figure 7 is a fluxion chart, showing the difference between the performance of averaged as compared to graduated porosity cone-shaped packing rings when placed in the stuffing-box of Figure 4.
Figure 7:
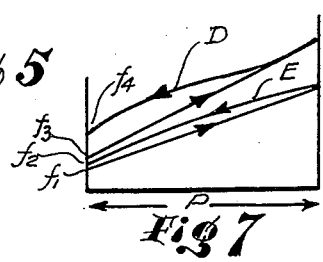

The efficiency of the reactions of packing in sealing pressure may always be compared by the friction created. The great variation of friction found in different types is caused by saturation effects, the friction due to choice of materials being of little moment. Comparative measurement of saturation has been accurately determined by my "fluxion chart," as shown in Figure 7. The ordinates are in terms of friction, and the abscissae laid off as impressed pressures. The upper curve D, a fluxion curve of an averaged density cone-shaped set of rings in the box of Figure 4, starts with a high initial set of $f_3$ and increases uniformly to $F_2$ at full impressed pressure.

During the reduction of pressure the saturation of all such rings is high, giving a final value of $f_4$. The hysteresis value $f_4-f_3$ usually persists from one-half hour to an hour before reducing to the initial set $f_3$.

The lower curve E is a fluxion chart of graduated porosity rings according to this invention and used in the stuffing-box of Figure 4. The initial set of $f_1$ is lower and the slope of the increasing friction curve is less than that of curve D. During the reduction of pressure, the friction due to saturation is slight, the hysteresis value $f_2-f_1$ disappearing in a few minutes to coincide with the initial set, and the porosity can be so governed that hysteresis will vanish in a few seconds. The improvements in the relations of saturation due to this invention, as checked by the fluxion chart alone justify its approval.

It is now in order to consider how the porosity is to be regulated in degree. Obviously the general method as described is to decrease the degree as the thrust is accumulated, the densest body being farthest from the source of pressure. It should be borne in mind that any initial degree of porosity will be reduced by the amount of thrust it is subjected to, so that the construction must be such that the degree of porosity required will be obtained after the compacting which is caused by the thrust.

The claims of efficiency herein described are further detailed as the predetermined control of friction distribution at given rates. If the friction is uniformly distributed over every unit of area, obviously the drop of pressure thruout the assembly is along the line U of Figure 6, so that the rate of distribution is equal between each and every ring. Aside from this ideal condition it is sometimes advisable to control the internal pressure drop at a rate different from the equal state, as by a curve X, the rate of curvature change being uniform, which indicates that the distribution between any two areas could be at a predetermined rate. This invention then is intended to include the conditions which may be uniform between any two areas of contact and would not therefore include any two areas which show a sudden change of internal pressure.

There are many impregnable, yet slightly flexible packing materials which by special construction may be made to conform to this general scheme of graduated porosity. Fiber strips, for example, can be profusely perforated close to the source of pressure, the amount of the perforations or the area in perforation being reduced as the distance increases from the source of pressure. The foregoing also applies to coils of all kinds. Plastic cones or rings can be graduated by using coarse granulations of material adjacent to the source of pressure, thus increasing the fineness farther away from the source of pressure. Some kinds of plastics which are compressed in the stuffing-box and as a bushing, can be graduated by giving different degrees of compression thruout the structure. Fabrics may be impregnated with coarse granular particles adjacent to the source of pressure, the fineness of impregnants being increased farther from the source of pressure. It should also be apparent that graduation of porosity is applicable to a single packing member.

Any type of standard packing ring when made in different degrees of porosity and assembled according to this invention will operate at maximum efficiency, create the least friction possible as determined by its construction, hold the highest pressure possible as limited by its construction, and endure the longest time.

It should be apparent that my method of graduating porosities in adjacent packing members has a universal application for all forms of porous packing assemblies, and such applications are construed to be subject to the following claims.

I claim:

1. A stuffing box about a moving shaft, subjected to fluid pressure from its inner end, porous, absorbent packing rings of frusto-conical shape in said box, said rings being of gradually increasing density toward the outer end of said box away from the source of fluid pressure.

2. A stuffing box about a moving shaft, subjected to fluid pressure from its inner end, porous, absorbent packing rings of frusto-conical shape in said box, said rings being of gradually increasing density toward the outer end of said box away from the source of fluid pressure, the smaller ends of said rings being presented toward the source of fluid pressure.

3. A stuffing box about a moving shaf subjected to fluid pressure from the inner end thereof, porous absorbent packing rings in said box, said rings being of different densities, said rings being arranged so that the densities of the rings increase away from the said inner end, so hat the friction on said shaft due to said fluid pressure will be approximately uniform along said shaft.

4. A stuffing box about a moving shaft, rings of porous packing material in said box about said shaft to seal against escape of pressure fluid exerted thereon from one end of said box, said rings being of different densities gradually increasing away from the source of said fluid pressure.

HARLEY T. WHEELER.